Figure 1:
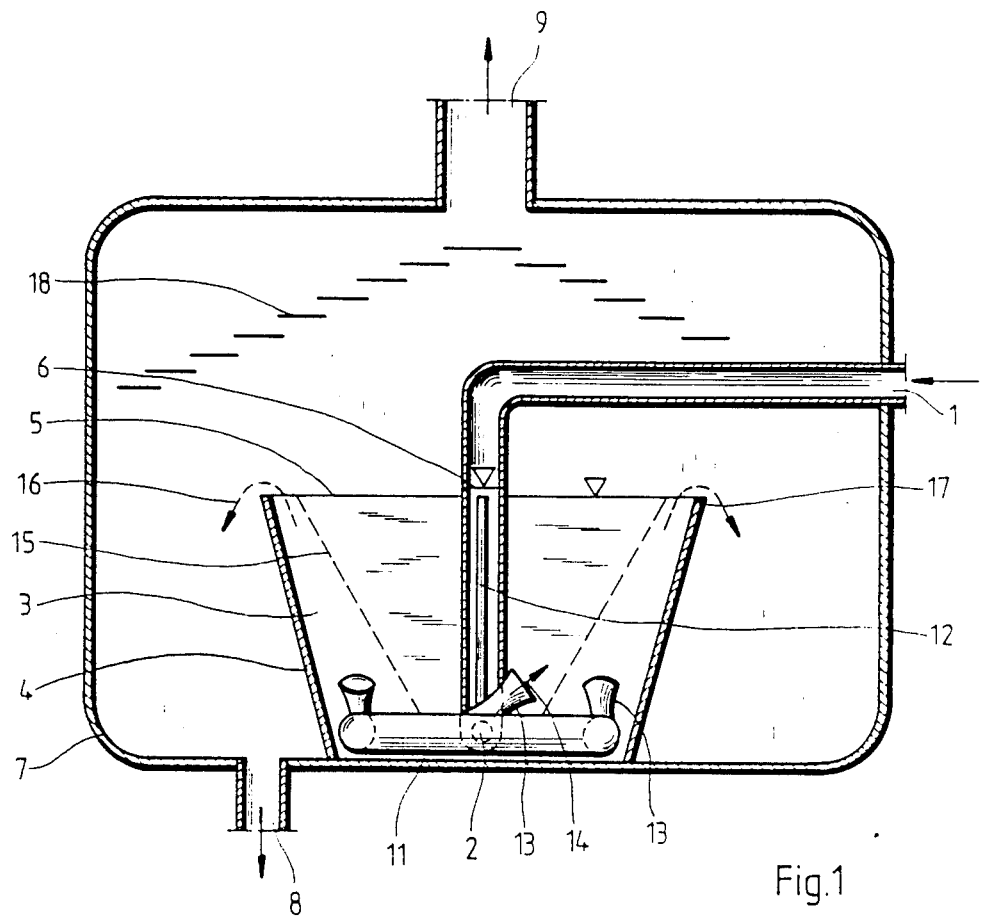

United States Patent [19]

Schweiger

[11] Patent Number: 4,801,424

[45] Date of Patent: Jan. 31, 1989

[54] LIQUID RECEIVER WHICH ACTS AS A PRESSURE RELIEF VALVE FOR A NUCLEAR REACTOR

[75] Inventor: Fritz Schweiger, Denzlingen, Fed. Rep. of Germany

[73] Assignee: Hochtemperatur-Kernkraftwerk GmbH, Hamm, Fed. Rep. of Germany

[21] Appl. No.: 888,048

[22] Filed: Jul. 18, 1986

[30] Foreign Application Priority Data

Jul. 20, 1985 [DE] Fed. Rep. of Germany ....... 3525986

[51] Int. Cl.$^4$ ................................................ G21C 9/00
[52] U.S. Cl. ..................................... 376/283; 55/204; 261/77; 261/124
[58] Field of Search ................... 261/77, 124; 376/283; 55/204

[56] References Cited

U.S. PATENT DOCUMENTS

| | | | |
|---|---|---|---|
| 313,431 | 3/1885 | Kuhn | 261/124 |
| 2,077,907 | 4/1937 | Streander | 261/77 |
| 2,316,729 | 4/1943 | Tryon | 55/204 |
| 4,086,308 | 4/1978 | Jürgens et al. | 376/283 |
| 4,399,082 | 8/1983 | Becker et al. | 261/124 |
| 4,567,016 | 1/1986 | Tong | 376/283 |
| 4,687,626 | 8/1987 | Tong | 376/283 |

FOREIGN PATENT DOCUMENTS

| | | | |
|---|---|---|---|
| 2049792 | 4/1972 | Fed. Rep. of Germany | 376/283 |
| 2204829 | 8/1973 | Fed. Rep. of Germany | 55/204 |
| 2931140 | 6/1984 | Fed. Rep. of Germany | |
| 1207073 | 2/1960 | France | 261/77 |
| 239761 | 9/1925 | United Kingdom | 261/124 |
| 2074698 | 11/1981 | United Kingdom | |

OTHER PUBLICATIONS

Mostert, "Dodewaard Nuclear Powerstation," *Euro Nuclear*, vol. 3, No. 1, Jan. 1966, pp. 37–40.

*Primary Examiner*—Salvatore Cangialosi
*Assistant Examiner*—Richard W. Wendtland
*Attorney, Agent, or Firm*—Toren, McGeady & Associates

[57] ABSTRACT

A liquid receiver which acts as a pressure relief valve for radioactive vapor or gases from a nuclear reactor comprises a container 4 holding liquid 3 and nozzles 13 which discharge vaporous or gaseous coolant from an outlet 2 from the reactor into the liquid 3. So that the liquid 3 does not lose its barrier capability during a temporary rise of pressure or at low outflow rates of the coolant from the outlet but can be expelled independently of the nature and temperature of the coolant, the nozzles 13 are mounted on a nozzle ring 11 which has a vertical axis and all the nozzles are directed tangentially in the same direction to generate a cyclone effect in the container 4. This causes the liquid 3 to have its surface lowered from the static level 5 to the rotational surface 15. This reduces the length of the path of the escaping gas or vapor through the liquid 3.

3 Claims, 1 Drawing Sheet

U.S. Patent

Jan. 31, 1989

4,801,424

LIQUID RECEIVER WHICH ACTS AS A PRESSURE RELIEF VALVE FOR A NUCLEAR REACTOR

This invention relates to a liquid receiver which serves as a pressure relief valve for radioactive vapours or gases from a nuclear reactor, for example a light water reactor or a helium cooled high-temperature reactor, the receiver comprising a container, which, in use, holds liquid, and nozzles which discharge vaporous or gaseous coolant from the reactor into the liquid in the container when an accident occurs.

Such a device is described in German Patent Specification No. 29 31 140. The container of liquid is situated between the reactor pressure vessel and/or the reactor protective vessel (containment) and a pressure-relief station comprising a washing cyclone and a drier cyclone. The pressure-relief station, according to operating rules, need operate only in case of an accident when a fairly large quantity of radioactivity contaminated coolant escapes into the reactor containment due, for example, to leakages in the coolant circuit. In normal operation of the nuclear reactor, in contrast, a slight sub-atmospheric pressure is maintained in the containment, preferably to avoid the escape of radioactive gases and vapours at the locks for the entry of personnel and material to the containment. The pressure-relief station, through which the clean coolant, that is cleansed of radioactive constituents, is to be discharged to atmosphere, is therefore closed off from the atmosphere of the reactor pressure vessel or the discharge line of a conventional pressure relief valve of the reactor pressure vessel during trouble-free reactor operation, by means of a container of liquid which also acts as a pressure relief valve.

In order to protect devices, especially electronic devices in the containment, and to make the containment accessible as soon as possible again after a fault or accident, the pressure relief valve should respond in a relatively wide pressure range of about 1 to $50 \times 10^3$ Pa. Such a fault is indeed hardly to be expected during the life of a nuclear reactor, but nevertheless measures must be taken for reliably managing the fault and ensuring the repair and further operation of the entire plant.

As a pressure relief valve which operates at the small pressures involved in the circumstances under consideration, a container of liquid, e.g. water, is provided in the arrangement disclosed in German Specification No. 29 31 140. This is situated in a closed vessel, which has a gas and air collecting space above the liquid surface, and has a nozzle system located below the liquid surface for introducing the coolant gas and/or coolant vapour.

Such a container of liquid can, indeed, not be bettered by any mechanical valve or any bursting membrane in respect of its reliability, response accuracy and freedom from maintenance, but it does have the disadvantage at low pressures that the liquid cannot be ejected from the container even at the relevant response relief pressure, but may need to be heated and evaporated first by the superheated steam or other vapour issuing at the excess pressure. Non-condensable gas can therefore only percolate through the liquid and possibly heat it up, whereas steam is fully condensed and thus heats up the liquid.

Insofar as superheated steam or very hot, non-condensable gases are involved, the liquid in the container will be relatively rapidly evaporated as desired. If, however, wet steam enters the liquid, then of course an increase in the quantity of liquid and no evaporation may be expected. Condensation which tends strongly towards complete condensation is, however, not desired. The requirements of the liquid in the container are that the purification plant connected downstream of it shall be loaded in the optimum manner. It should therefore fulfil the following purposes:

Act as pressure relief valve for small steam and/or gas pressures, but be closed in normal operation;

When the response pressure is slowly exceeded, permit condensation of the steam or percolation and cooling of the non-condensable gases;

With a steep rise in pressure in the case of superheated steam, cause evaporation and ejection of the liquid in the container (in the case of wet steam, the liquid should be ejected as rapidly as possible; in the case of hot gases ejection of the liquid is not necessary, but is no disadvantage);

Reliably prevent water shocks in every case, regardless of the relevant steam or other vapour conditions.

The first two purposes can be fulfilled by a container of liquid not of special construction. In the case of superheated or wet steam, the fulfillment of the purposes is considerably more difficult. If water shocks are to be prevented, then the steam must be blown into the water in the container via nozzles, as described in German Specification No. 29 31 140. This has the advantage that the liquid shocks are broken down into a large number of smaller shocks, which leads only to a hissing sound, but it has the decisive disadvantage that in the case of wet steam, unlike superheated steam, the volume of liquid in the container continually increases and thus the plant becomes flooded.

If a pipe bent to a U-shape and filled with water were used as a liquid container, then the advantage would be obtained of reliability of response and freedom of maintenance, but there would be the disadvantage that the liquid would be ejected from the U-tube even if a specified pressure were only temporarily exceeded. Even with leaks having relatively low outflow rates of the coolant, the liquid is ejected from such a container. Added to this the aforementioned water shocks would take place in the ascending arm of the U-tube both under a short-term pressure increase and also at relatively low outflow rates, if the escaping coolant is steam.

The object of the present invention is to construct a liquid receiver as initially described so that it shall not lose its barrier capability under a temporary increase of pressure or at low outflow rates of the coolant gas or vapour, but only when the fault has completed its transient behaviour and has stabilised, and so that the liquid in the container shall be only partially ejected regardless of whether the device has gas, wet steam, superheated steam or a gas-steam mixture escaping into it.

To this end, according to this invention, in a liquid receiver as initially described the nozzles lead from a nozzle ring which has an upright axis and are directed in the container substantially tangentially to the ring in the same direction as each other around the ring to produce a cyclonic effect in the coolant and in the liquid in the contaienr.

The nozzles which may be trumpet-shaped and diverge in the direction of flow, are preferably oriented obliquely upwards. Furthermore, the container preferably has a wall of approximately truncated conical shape, and the nozzle ring is located on the bottom of the container.

By the arrangement in accordance with the invention, a cyclone effect is exerted upon the liquid in the container, and this causes a quantity of the liquid to be ejected from the container. This quantity increases with the speed of the cyclone and hence with the excess pressure to be relieved. This means firstly that a thorough mixing of gas or vapour and liquid is created inside the liquid in the container by means of the generally circular flow caused by the entering gas or vapour and thus a distribution of the condensation heat over the entire volume of the liquid is assured. Above all, however, the nozzles of the nozzle ring which produce the cyclone effect cause the liquid contained in the container to revolve, so that the originally horizontal liquid surface changes into a more or less funnel-shaped or parabolic surface due to the centrifugal force accompanying the cyclone action. Therefore the liquid originally contained in the container is ejected to a greater or lesser extent as a function of the excess pressure to be released. This in turn brings about the advantage that the condensation of the vapour decreases in the desired manner with increasing excess pressure and also the pressure loss of the gas and/or vapour mixture in the liquid decreases, because the gas and/or vapour jets issuing from the nozzles of the nozzle ring no longer need to flow through the liquid contained in the vessel as far as the original, static surface level but only as far as the surface of rotation. The coolant gas or vapour can, therefore, penetrate through a relatively thin layer of liquid virtually without condensation on the now short path from the nozzles to the rotational surface. The nozzle system, therefore does not need to be designed to provide a more reliable condensation of the steam or other vapour but in such a way that the rotational velocity of the liquid in the container becomes a maximum. A relatively small number of large and therefore more easily maintained nozzles are satisfactory for this purpose. The steam or other jets issuing from these nozzles can penetrate virtually without condensation through the revolving liquid in the container which is thin at high rotational speeds. The inclination and the clear diameter of the nozzles and also the other dimensions of the assembly can be ascertained without difficulty by tests for the particular application required.

Figure 2:
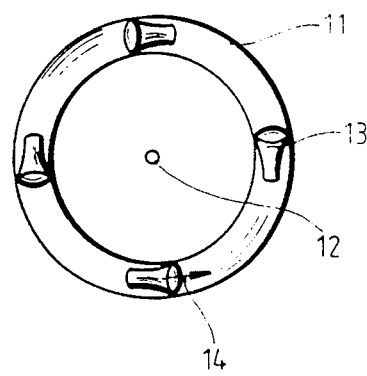

An example of a liquid receiver in accordance with the invention is illustrated in the accompanying drawings in which:

FIG. 1 is a diagrammatic section through the receiver mounted in a collecting vessel of a reactor; and FIG. 2 is a plan of a nozzle system forming part of the receiver.

As shown in FIG. 1, a coolant relief line 1, leading from a reactor pressure vessel and/or from a reactor containment, has an outlet 2 in a liquid container 4, containing water or other liquid 3. The outlet 2 is below the static liquid level 5 in the container 4. In the at-rest state, the liquid level 5 in the container 4 is, in this example, somewhat lower than the liquid level 6 in the coolant line 1, because a sub-atmospheric pressure is maintained in the reactor containment. The container 4 is situated in a gas or air collecting vessel 7 having an outlet 8 leading to a washing device and an outlet 9 with a coolant discharge line connected thereto.

A nozzle ring 11 with a vertical axis 12 is connected to the outlet 2 of the coolant line 1 and is seated on the bottom of the container 4. As shown in FIGS. 1 and 2, the nozzle ring 11 has a ring of nozzles 13, the outlet openings of which are oriented tangentially and obliquely upwards in the direction of an arrow 14.

When the nozzles 13 of the nozzle ring 11 are discharging coolant vapour or gas, the liquid 3 starts to rotate about the central axis 12. By the cyclone effect and the centrifugal force thus produced, the liquid 3 is forced against the wall of the container 4, which is for example of approximately truncated conical shape, so that the horizontal, static liquid level 5 changes into the somewhat funnel-shaped or parabolic rotational liquid surface 15 and a portion 16 of the liquid 3 is expelled over the upper edge 17 of the container 4. The edge 17 may be outwardly flanged. Due to the decrease in the quantity of liquid in the container 4 and due to the change from the static liquid level 5 to the rotational surface 15, a reduction in condensation and at the same time a rapid decrease in the pressure loss of the gas and/or vapour mixture issuing from the outlet 2 into the liquid 3 is achieved, because the gas or vapour jets issuing from the nozzles 13 in the direction 14 no longer have to flow through the liquid 3 as far as the static liquid level 5, with the vapour condensing to the detriment of the object to be achieved and finally heating up the liquid 3. Instead the vapour can now penetrate virtually without condensation through a relatively thin layer of liquid on the now reduced path from the nozzles 13 to the rotational surface 15.

Inside the collection vessel 7, a moisture droplet separator 18 is advantageously provided above the liquid 3. The separator prevents the liquid which is entrained with the vapour or gas issuing from the nozzles 13 from reaching the coolant line 9 from the vessel 7.

In the case of a fault which causes a relatively steep rise of pressure of the coolant gas or vapour especially in the case of pure steam, water shocks could occur as long as the water 3 in the container 4 does not rotate. The water volume in the nozzle ring 11 and in the line 1 is, however, of great importance here, because it must be displaced by the arriving steam and therefore be expelled from the nozzles. It therefore initiates the rotation of the liquid 3 in the container 4.

I claim:

1. A nuclear reactor having a pressure relief valve comprising a gas collecting vessel, a liquid receiver located within and fully enclosed by said vessel for receiving radioactive vapors or gases from the nuclear reactor, said receiver comprises a container having a bottom, sides extending upwardly and flaring outwardly from the bottom and said container being open at the top of said sides into said collecting vessel, liquid held, in operation, in said container and forming a horizontal liquid level adjacent the top of said container, nozzles for discharging vapors or gaseous coolant from said reactor into said liquid in said container in the event of an accident occurring, and means for supplying said vapors or gaseous coolant to said nozzles, said means for supplying said coolant to said nozzles includes a horizontal tubular circular ring having an upwardly extending central axis with said tubular ring located within and on the bottom of said container spaced downwardly from the horizontal liquid level, said ring having a lower surface adjoining the bottom of said container and an upper surface located below and facing toward the liquid level, said nozzles mounted on the upper surface of said ring in communicating relationship therewith and for directing flow into the liquid in said container below the liquid level, said nozzles being directed substantially tangentially to said ring and directed obliquely upwardly from said ring for discharging coolant in the same direction as each other around said ring into the liquid in said container whereby discharge of said vapors or gaseous coolant in the event of an accident occurring from the nozzles into said liquid in said container produces a cyclonic effect in said coolant and in said liquid in said container causing a portion of said liquid to be expelled from the top of said container into said vessel and the liquid under the cyclonic effect within the container to assume a somewhat funnel-shaped or parabolic rotational liquid surface within said container extending downwardly from the horizontal liquid level and covering said nozzles so that the coolant flows from said nozzles through the liquid and passes out of the liquid at the rotational liquid surface and flows into said vessel.

2. A nuclear reactor as set forth in claim 1, wherein said ring having an external diameter which is substantially equal to the diameter of said bottom.

3. A nuclear reactor as set forth in claim 1, wherein said vessel has upwardly extending sides and a top with said sides spaced outwardly from said container and said top spaced upwardly from the top of said container, said vessel having a bottom with a first outlet extending from the bottom of said vessel and a second outlet extending upwardly from the top of said vessel, and a moisture droplet separator located within said vessel above said container for preventing liquid drained within the coolant from reaching the second outlet.

* * * * *